United States Patent [19]

Henderson et al.

[11] 3,953,275
[45] Apr. 27, 1976

[54] METHOD AND APPARATUS FOR LIQUID ADHESIVE APPLICATION

[75] Inventors: David L. Henderson, O'Fallon; Joseph R. Hickman, Webster Groves, both of Mo.

[73] Assignee: Emerson Electric Co., St. Louis, Mo.

[22] Filed: Jan. 30, 1975

[21] Appl. No.: 545,399

[52] U.S. Cl. ............................... 156/278; 118/227; 118/238; 156/563; 156/578
[51] Int. Cl.² ...................... B05C 1/00; B32B 31/00
[58] Field of Search ........... 156/278, 280, 299, 356, 156/547, 563, 578; 118/238, 248, 221, 227

[56] References Cited
UNITED STATES PATENTS

| | | | |
|---|---|---|---|
| 3,356,360 | 12/1967 | Ward | 156/563 |
| 3,573,129 | 3/1971 | Zeis | 156/299 |
| 3,620,885 | 11/1971 | Schiaudroff | 156/563 |
| 3,620,886 | 11/1971 | Sims | 156/563 |
| 3,866,568 | 2/1975 | Minami | 118/238 |

Primary Examiner—Douglas J. Drummond
Attorney, Agent, or Firm—Polster and Polster

[57] ABSTRACT

A method and apparatus for applying liquid adhesive to the outer surface of a stack of laminations are provided which results in more precise adhesive application. The laminations are placed on a mandrel which is mounted for reciprocal movement along the longitudinal axis of the mandrel. The adhesive is applied by roller pads which abut the laminations during mandrel movement. The direction and speed of roller pad rotation is coordinated with the mandrel speed and the direction of mandrel movement. This coordinated movement prevents lamination fanning and adhesive smear during application of the adhesive to the lamination stack. Means are provided for adjusting the rate at which adhesive is supplied to the roller pads from an associated adhesive reservoir and for adjusting the pressure with which the roller pads abut the lamination stack. These adjustments in conjunction with the roller pad applicators enable the apparatus of this invention to apply adhesive between the facing surfaces of adjacent laminations in a more precise manner so that large areas of the facing surfaces and the inboard edge of the lamination stack remain free of adhesive material. Thereafter, the stack is clamped under predetermined axial pressure, and the adhesive is cured.

16 Claims, 6 Drawing Figures

FIG. I.

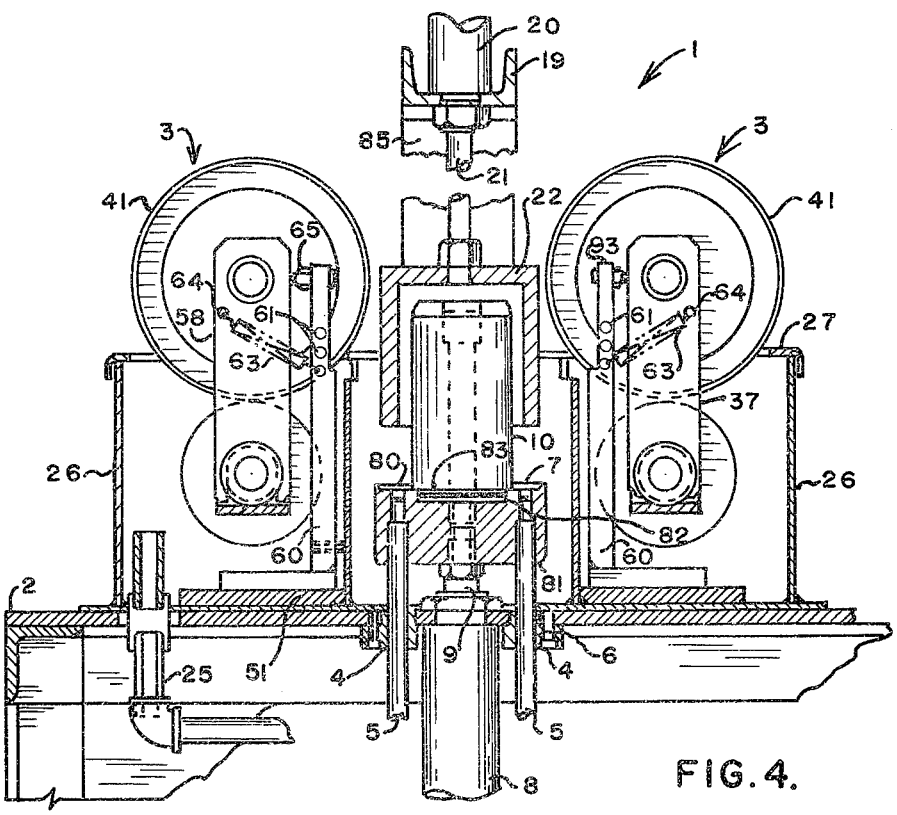
FIG. 4.
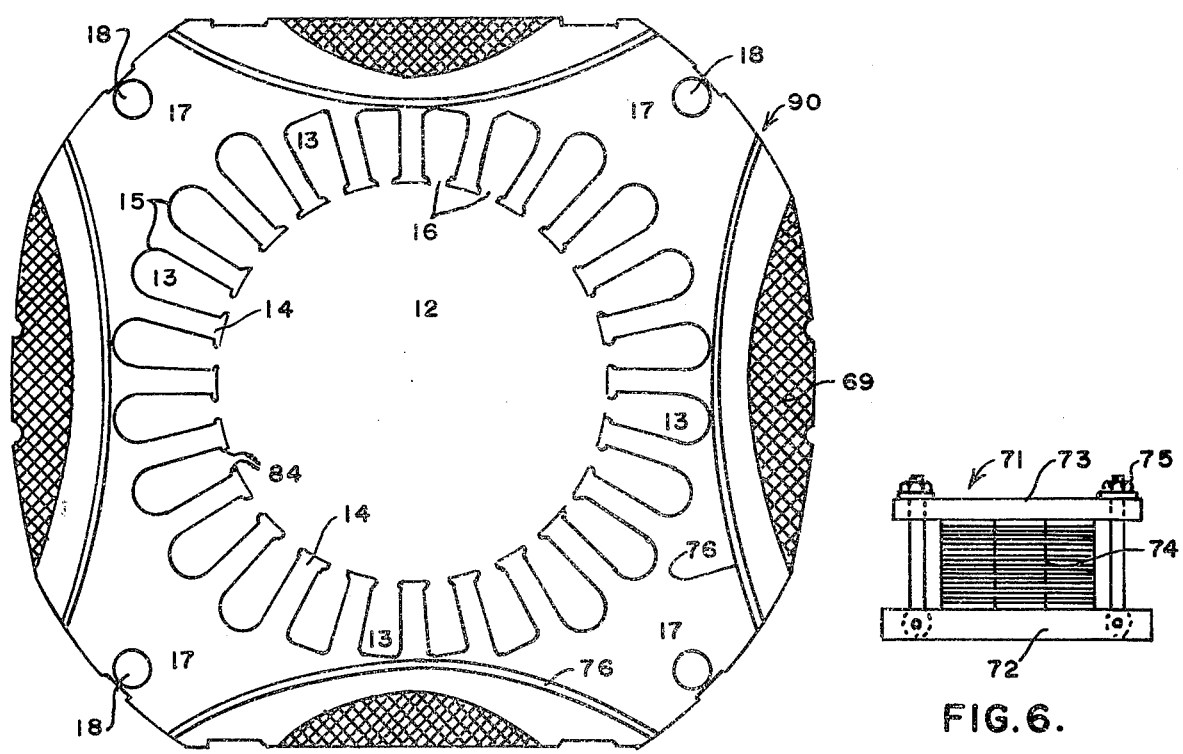
FIG. 5.
FIG. 6.

METHOD AND APPARATUS FOR LIQUID ADHESIVE APPLICATION

BACKGROUND OF THE INVENTION

This invention relates to the construction of core assemblies for dynamoelectric machines. While the invention is described with particular reference to stator cores utilized in hermetic motor assemblies, those skilled in the art will recognize the wider applicability of the invention described hereinafter.

The prior art reveals a number of methods and machines for constructing core assemblies for electric motors in which the sole bonding medium is a adhesive. Previously known methods have included dipping cores which have been previously welded or cleated, dipping individual laminations or spraying them before they are stacked, forcing adhesive under pessure through a clamped core, or permitting the adhesive to wick inwardly of the lamination stack.

Among the problems experienced with cores having adhesive as the bonding medium is that relating to loss of bolt down torque in certain applications. It is conventional for motor manufacturers to provide stator core assemblies for hermetic compressors, for example, having bolt receiving openings through the core. The openings permit the compressor manufacturer to install the core assembly in a particular application. As may be surmised, mounting is accomplished by conventional threaded fasteners or bolts which are tightened against the core at some predetermined force, known in the field of this invention as bolt down torque. It has been found that when the laminations making up a core are coated with adhesive on their radial surfaces, baked, and thereafter mounted on a base by means of through bolts, the through bolts lose torque when the motor, sealed in a hermetic system, is subjected to the heat of a dehydration cycle to which a compressor is subjected in the course of manufacture. Cores so constructed also have been known to lose torque after field installation, permitting the core to shift. Shifting of the core results in compressor destruction if the core strikes the rotor assembly of the motor in the course of compressor operation. Solutions to loss of bolt down torque commonly have involved methods of constructing the core so that adhesive generally is not allowed to contact the area around the bolt holes, or removing the adhesive in later constructional steps if it is initially allowed along the bolt hole areas. While these prior art methods work well for their intended purposes, in general they are accomplished only by utilizing excessive amounts of adhesive material in conjunction with high tooling and high maintenance costs.

Adhesive bonded cores also have created heretofore unresolved peripheral manufacturing problems in that the adhesive, even where it was kept clear of the area surrounding the bolt holes, has been allowed to seep out along the inner edge of the lamination stack. Motor laminations conventionally have a central bore opening having a plurality of spaced teeth extending radially outwardly from the bore. Adjacent teeth define winding receiving slots. The slots are closed at one end and communicate with the bore at a second end along an opening between adjacent teeth. The inner edges of the teeth define both the bore opening and the inner edge of the lamination or lamination stack. In winding the core, it is conventional to insert the winding axially through the bore. The winding enters the slots along the openings between adjacent teeth. Machines for axially inserting the windings include tooling which rides along the inner edge of the lamination stack. The presence of adhesive along the inner edge of the lamination stack affects the useful life of the winding insertion tooling, resulting both in higher manufacturing costs because of increased maintenance and higher material costs.

The prior art does disclose apparatus which applies adhesive to a lamination stack at precise locations. For example, the U.S. patent to Zeis, U.S. Pat. No. 3,573,129, issued Mar. 30, 1971, shows a device and a method for applying adhesive to a stack of loose laminations at predetermined intervals along the outer edge of the lamination stack. While the Zeis patent works for its intended purpose, the degree of control available for controlling the amount of adhesive applied to a lamination stack has been unsatisfactory. That is to say, while the Zeis apparatus possesses sufficient adjustments for controlling the application of adhesive to a lamination stack at low manufacturing rates, in production use adhesive often appears along the inner edge of the lamination stack. Attempts to control with consistency the adhesive pattern of the Zeis apparatus at high manufacturing rates have been unsuccessful. As indicated, adhesive along the inner edge is an undesirable end result in the construction of an adhesive bonded core.

The method and apparatus disclosed hereinafter overcomes these previously unresolved prior art difficulties by utilizing a novel structural combination having a plurality of adjustments associated with it for controlling the application of adhesive to predetermined areas along the faces of adjacent laminations. The structure and method have resulted in the ability to provide an easy to monitor system for core production capable of high production rates and relatively close tolerance adhesive application so that the spreading of adhesive to the inner edge of the lamination stack is avoided, as is the application of adhesive about the lamination bolt hole area.

One of the objects of this invention is to provide a process for making core assemblies which accurately controls the application of adhesive to the core.

Another object of this invention is to produce an adhesive bonded core assembly having through bolt openings in it and an inner lamination edge in which both the inner lamination edge and the area about the through bolt openings are free of adhesive material.

Another object of this invention is to provide a low cost method for manufacturing adhesive bonded core assemblies.

Yet another object of this invention is to provide a device for applying adhesive to a stack of laminations having a plurality of easily adjustable adhesive application control means.

Other objects of this invention will be apparent to those skilled in the art in light of the following description and accompanying drawings.

SUMMARY OF THE INVENTION

In accordance with this invention, generally stated, apparatus is provided by which, and a method is provided in which, a multiplicity of laminations is stacked to define an outer surface made up of outer edges of the laminations. The laminations are placed on a mandrel which is mounted for reciprocal movement in a direction corresponding to the longitudinal axis of the mandrel. At least one roller having a porous surface facing is mounted for rotation and adapted to abut the outer edge of the laminations during mandrel movement. The roller speed of rotation and the direction of roller rotation are coordinated with mandrel movement to insure even application of adhesive to the outer edge of the lamination stack and to prevent fanning of the laminations during adhesive application. Means also are provided for controlling the application of adhesive to the roller facing from an associated adhesive reservoir and for adjusting the pressure with which the roller abuts the lamination stack. After adhesive application, the stack is clamped under predetermined axial pressure and the adhesive is cured.

BRIEF DESCRIPTION OF THE DRAWINGS

In the drawings.

FIG. 4 is a sectional view, partly broken away, taken along the line 4—4 of FIG. 1;

FIG. 5 is a top plan view of a lamination illustrating various adhesive patterns provided with the apparatus and method of FIG. 1; and FIG. 6 is a view in side elevation showing a core clamped for curing.

DESCRIPTION OF THE PREFERRED EMBODIMENT

Figure 1:
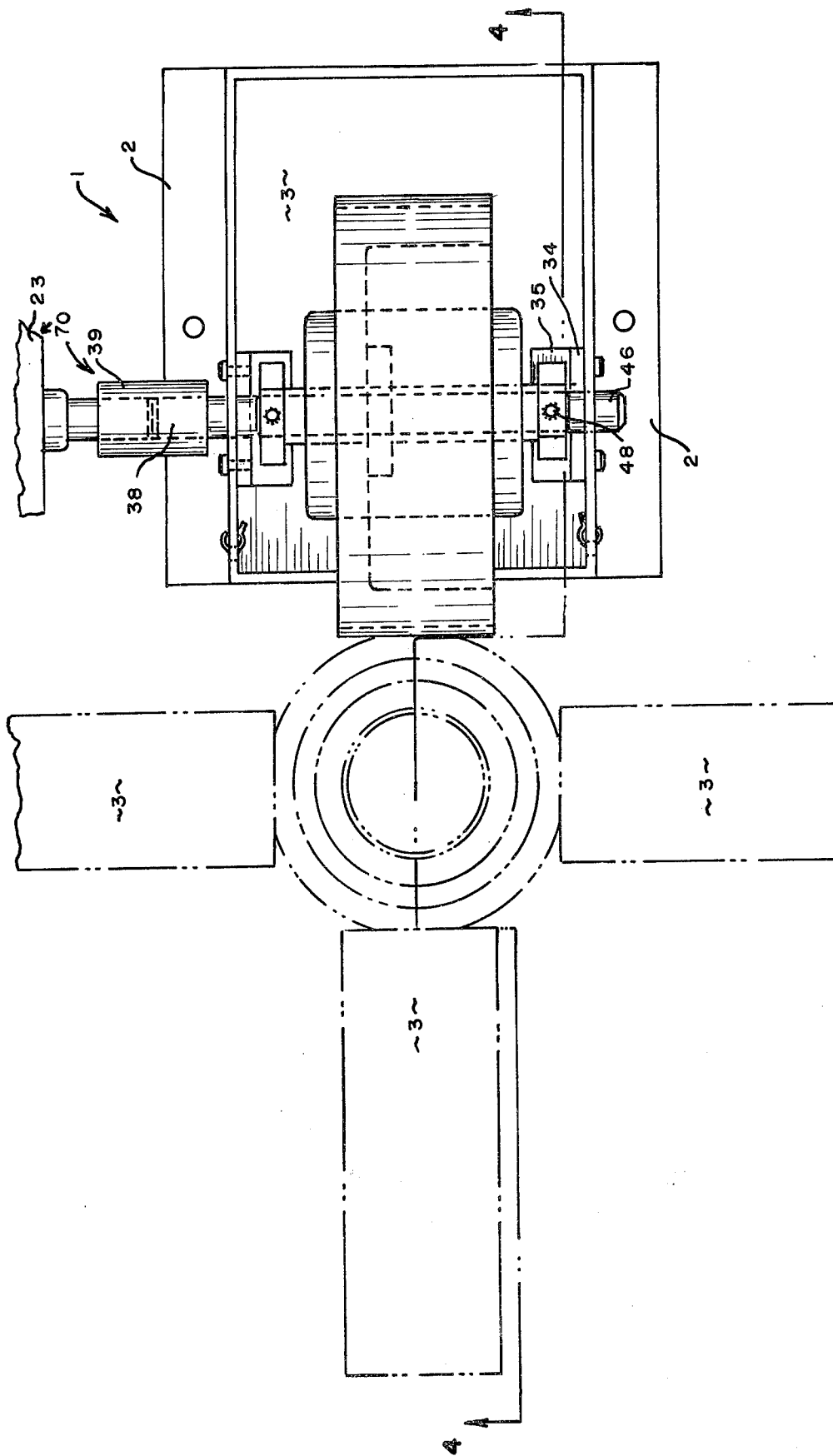
FIG. 1 is a top plan view, partly broken away, showing one embodiment of apparatus of this invention for applying adhesive and illustrating one step of the process of this invention.

Referring now to the drawings for one illustrative embodiment of apparatus and process of this invention, reference numeral 1 indicates apparatus by which the initial steps of the process are accomplished. The apparatus 1 includes a supporting table 2 having a plurality of adhesive applicator stations 3 mounted to it. Each of the stations 3 are identical and only a single station is described in detail. While the number of stations may vary in embodiments of our invention, we have found four applicator stations generally desirable in constructing stator cores in accordance with the process of our invention. Four stations provide sufficient adhesive application for a strong core and the adhesive can be applied in a single complete pass of the lamination stack, as later described.

The table 2 has a pair of openings 4 in it, best seen in FIG. 4. The openings 4 are located centrally of the area surrounded by the stations 3. The openings 4 receive a pair of guide rods 5 which are slidably mounted through the opening pair 4 along bushings 6. The upper end of the guide rods 5, upper being referenced to FIG. 4, are attached to a mandrel support 7. A hydraulic cylinder 8 is secured to the supporting table 2, and is supplied with hydraulic fluid through appropriate tubing, not shown. The cylinder 8 contains a piston, a rod 9 of which extends through a hole in the table 2, and is attached, at its upper end, to the mandrel support 7.

Mandrel support 7 is a cylindrical body having a top 80 and a bottom 81. The support 7 is conventional and may assume a number of design shapes in plan and cross section. The particular support 7 illustrated is attached to the rod 9 and to the guide rods 5 along the bottom 81. Attachment may be accomplished by any convenient method. Mandrel support 7 is movable, in response to rod 9 movement, between at least a first upper position and a second lower position, again referenced to FIG. 4, which has the lower position illustratively shown. The top 80 of support 7 has a central opening 82 formed in it. The opening 82 has a threaded side wall which is designed to receive complementary threads formed along an end 83 of a mandrel 10 in a conventional manner. Other interconnection techniques are compatible with the broader aspects of this invention.

Mandrel 10 is a elongated cylinder adapted to receive a stack of loose laminations 11. Individual laminations 90 of the stack 11, best shown in FIG. 5, have a central opening 12 and a plurality of slots 13 extending radially outwardly from the opening 12. The slots 13 are defined by a plurality of spaced teeth 14. The slots 13 have a closed bottom 15 and a mouth 16 opening onto the central opening 12, between adjacent tips 84 of the teeth 14. The remaining portion of the lamination is known in the art as the lamination yoke, and is represented in the drawing by the numeral 17. The yoke 17 conventionally has a plurality of openings 18 in it, which are adapted to receive common bolt type fasteners, not shown, when the lamination stack 11, in its final stator assembly form, is mounted in a particular application, a hermetic compressor, for example. The radially outer edge of the yoke 17 defines the outer edge of a core constructed from the laminations 90, while the radially inner edge of the teeth 14 define the inner edge of that core. The mandrel 10 is sized to accept the laminations along the opening 12. Those skilled in the art will recognize that various dimensions of the lamination, that is, slot 13 size, opening 12 diameter, and lamination silhouette, for example, may vary. The mandrel 10, as indicated above, is releasably mounted to the support 7 in order to accommodate various mandrel designs consistent with lamination modification.

A head beam 19 is positioned above the supporting table 2 by any convenient method. For example, a vertical member 85 may be attached either directly or indirectly to the supporting table 2, and the beam 19 attached to it cantilever fashion. The beam 19 has a hydraulic cylinder 20 mounted to it, which is supplied with hydraulic fluid through control valves and tubing, not shown. The cylinder 20 contains a piston, a rod 21 of which extends through an opening in the head beam 19 and is attached at its lower end to a cylindrical, open bottom shroud 22. Shroud 22 is sized to pass the outer diameter of the mandrel 10 freely, so that the shroud 22 may pass over the free end of the mandrel 10 and engage the outboard lamination 90 of the stack 11. While the amount of force exerted by the shroud 22 on the laminations of the stack 11 may vary, for the purposes of our invention, the force applied is sufficient if it prevents fanning of the lamination 90 as adhesive is applied at the station 3, a process more fully described hereinafter.

The hydraulic cylinders 8 and 20 are aligned axially. The cylinder 8 is mounted to reciprocate the mandrel support 7, the mandrel 10, and any of the laminations 90 positioned on the mandrel 10, between at least the first and second positions discussed above. The cylinder 20, on the other hand, is intended to permit the shroud 22 to clamp stacks of laminations placed over the mandrel 10 against the mandrel support 7. For reasons later described, it is desirable that the mandrel 10 move at a constant speed as it reciprocates between its various positions under the influence of the cylinder 8. For that reason, control means, not shown, for varying the pressure applied by the cylinder 8, are required. That is, as the cylinder 8 moves the mandrel 10 downwardly, referenced to FIG. 4, the pressure applied to the one side of the piston within the cylinder 8 will be less than the pressure applied to the other side of the piston as the cylinder 8 drives the mandrel 10 upwardly, again referenced to FIG. 4, because of the downward pressure applied by the cylinder 20.

The laminations 90 of the stack 11 placed on the mandrel 10 are aligned, during or before that placement, so that the laminations are congruent with one another. In that position, the slots 13 define a plurality of axially extending winding receiving slots, the outer lamination edges define the outer surface, and the opening 12 defines a rotor assembly receiving, axially extending bore opening, the peripheral limit of which defines the inner edge of what will become a stator core. Each stack 11 will constitute a single stator core. The stack 11 fits closely but slidably on the mandrel 10.

Figure 2:
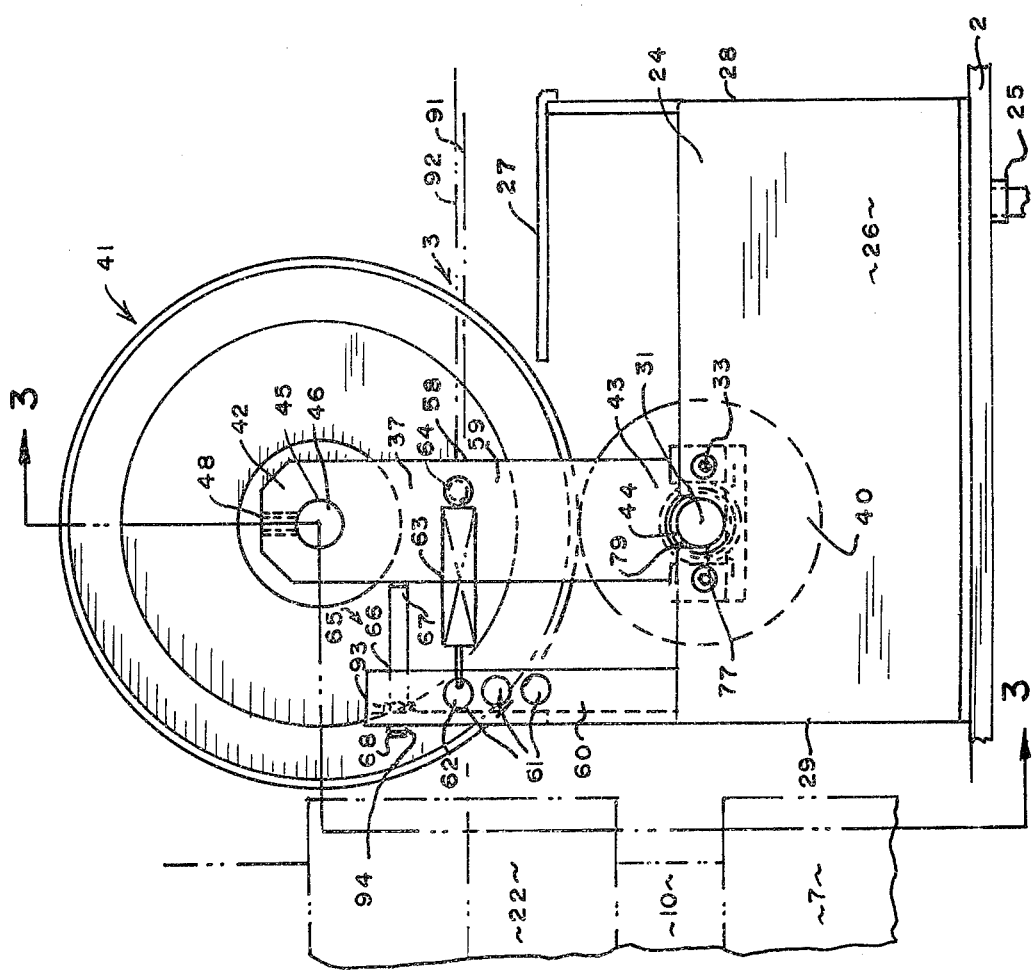
FIG. 2 is a view in side elevation of an illustrative roller applicator position utilized in conjunction with the device of FIG. 1.
Figure 3:
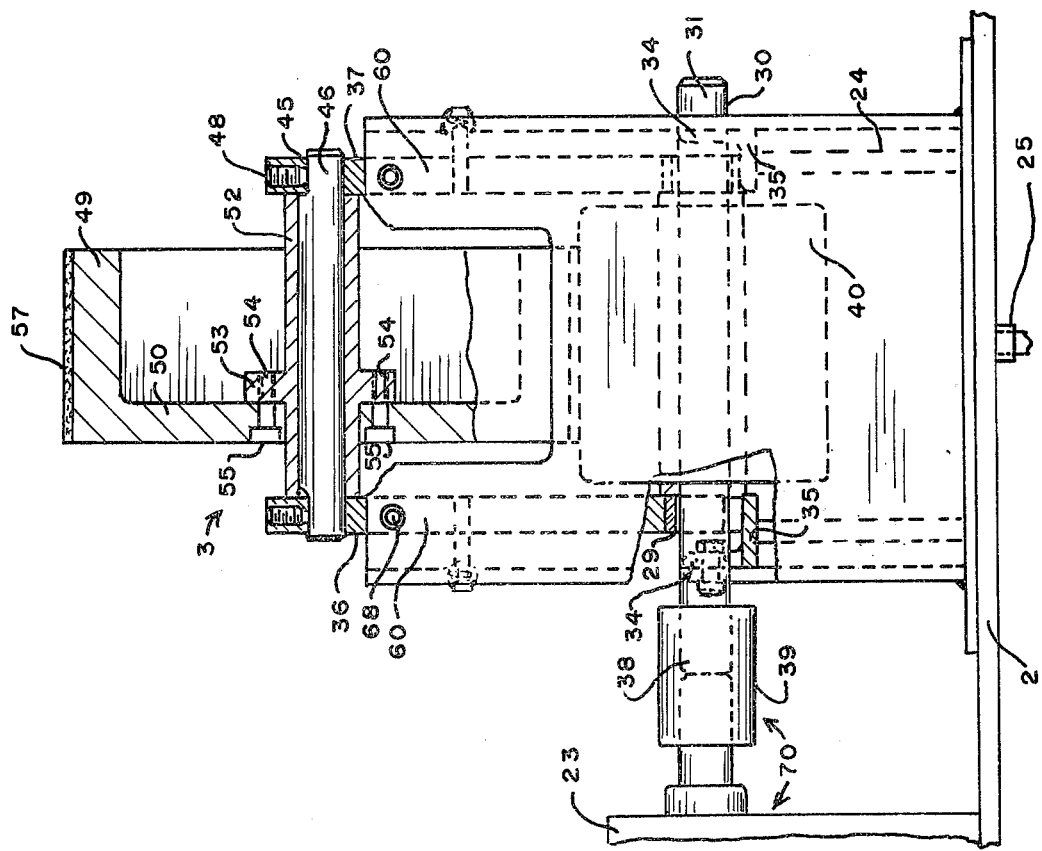
FIG. 3 is a partial sectional view taken along the line 3—3 of FIG. 2.

One individual applicator station 3 is shown in particular detail in FIGS. 2 and 3. As there shown, the station 3 includes an adhesive reservoir 24 connected to a source of liquid adhesive by a connection means 25. The reservoir 24 includes a side wall 26 and a top 27. The top 27 of the reservoir 25 is substantially open to permit passage of an adhesive applicator 41 and to permit observation of the adhesive level within the reservoir 24. The reservoir 24, in the embodiment illustrated, is rectangular in plan, having a first end 28 and a second end 29, the side wall 26 extending about the perimeter of the reservoir. The side wall 26 has a pair of aligned openings 30 through it on oppositely opposed sides of the wall 26. The openings 30 permit passage of a shaft 31. The shaft 31 is supported by and is mounted for rotation along a bearing surface 77 defined by each of the openings 30.

A bracket 32 is mounted adjacent to each of the openings 30 on the reservoir 24 side of the wall 26, by any convenient means. Conventional threaded fasteners, indicated generally by the numeral 33, work well, for example. The bracket 32 is L-shaped in side elevation having a first leg 34, and a second leg 35. The leg 34 receives the fasteners 33, while the leg 35 acts as a support for an arm 36 and an arm 37, later described in detail.

An end 38 of the shaft 31 is operatively connected through a suitable coupling 39, to a drive motor 23. Gear means, not shown, may be utilized in conjunction with the motor 23 to provide the desired shaft 31 speed. The coupling 39 and the motor 23 are conventional, and are not described in detail. Various commercially available devices are acceptable, provided the motor, and any associated gear means, are capable of generating the desired speed. The drive motor 23, with or without an associated gear means, and the coupling 39 define a drive means 70.

A doctor wheel 40 is mounted to the shaft 31, and is rotatable therewith. In the embodiment illustrated, doctor wheel 40 is a solid cylindrical section, and is preferably constructed from aluminum or other suitable material. The doctor wheel 40 may have a plurality of lands and grooves formed in it so as to give the doctor wheel 40 a knurled appearance. The grooves are formed in the doctor wheel 40 for the purpose of varying both the surface area and, consequently, the area of contact between the doctor wheel 40 and the applicator 41, and the amount of adhesive that is picked up by the wheel 40. The ability to vary the surface area, as by lands and grooves, for example, is important in the operation of the apparatus 1. That is to say, it is important to the operation of the apparatus 1, that the surface area of the doctor wheel 40 be adjustable. Consequently, it is desirable, if not mandatory, that the material from which the wheel 40 is constructed be easily machinable. The ability to vary the amount of adhesive transferred from the reservoir 24 to the applicator 41 by the doctor wheel 40 is one of the significant distinctions between our apparatus and devices prevalent in the prior art.

As indicated above, the arms 36 and 37 are supported by the leg 35 of the bracket 32, and extend upwardly therefrom, upward being referenced to FIGS. 2 and 3. Each of the arms 36 and 37 are identical, and only a single arm 36 is described in detail. Each of the arms 36 and 37 has a first end 42 and a second end 43. The end 43 has an open mouth channel 44 formed in it, which fits the shaft 31 yoke fashion, receiving the shaft 31 along a clearance 79 so that the shaft 31 is free to rotate independently of the arms 36 and 37. That portion of the end 43 of the arms 36 and 37 outboard of the shaft 31 rests on the bracket 32. The end 42 of arms 36 and 37 has an opening 45 through it, which is sized to receive a shaft 46 in a slip fit. In the embodiment illustrated, the shaft 46 is secured to the arms 36 and 37 by any convenient method. For example, conventional threaded fasteners inserted through openings 48 in each of the arms, work well. Other interconnection methods are compatible with the broader aspects of this invention. A bushing 47 is mounted over the shaft 46, between the arms 36 and 37.

Bushing 47 includes a generally cylindrical section 52 having an annular flange 53 extending radially outwardly from it. The flange 53 has a pair of openings 54 through it. The roller applicator 41 is attached to the bushing 47 and is rotatable with the bushing 47 on the shaft 46. The applicator 41 is cylindrical in plan, and has a U-shape in cross section. Applicator 41 includes a cylindrical outer wall 49 joined to a circular side wall 50. The openings 54 of the flange 53 are aligned with a pair of openings 55 in the side wall 50 of the applicator 41. An inner face 56 of the side wall 50 abuts the flange 53 and the applicator 41 is attached to the bushing 47 by conventional threaded fasteners, not shown, inserted through aligned ones of the openings 54–55.

A porous cover 57 defines the outer boundary of the applicator 41. The diametric dimension for the outer boundary of the applicator 41 is a determination made from at least two considerations. First, the diameter of the applicator 41 is chosen so that the cover 57 abuts the stack of laminations 11 as they move between the first and second positions in response to hydraulic cylinder 8 commands. Second, the diameter must be chosen so that the cover portion 57 will abut the doctor wheel 40, thereby permitting both adhesive transfer to the cover 57, and providing rotational drive to the applicator 41 in response to power input from the drive means 70.

Each of the arms 36 and 37 has a dowel 58 extending outwardly from a surface 59. The dowel 58 is conventional, and may be nothing more than a cylindrical section attached to the surface 59 by any convenient method.

A pair of beams 60 extend upwardly from the end 29 side of the reservoir 24. The beams 60 are aligned with the arms 36 and 37 and are attached within the reservoir 24 in a conventional manner. For example, a plate 51 may be supported by the table 2, the beams 60 being integrally formed with or attached to the plate 51 at a desired position. Each of the beams 60 has a plurality of openings 61 through them, which are sized to receive an end 62 of a biasing means 63.

Biasing means 63, in the embodiment illustrated, is a coil compression spring having a looped second end 64 attached to the dowel 58, while the end 62, which preferably is an open mouth hook shape in plan, is inserted through the openings 61 in the beam 60, thereby attaching the spring to the beam. The openings 61 and biasing means 63 accomplish a dual function. First, the biasing means 63 exerts a force in the applicator 41 tending to draw the applicator 41 toward the mandrel 10. This force may be adjusted by inserting the end 62 of the biasing means 63 in the various openings 61. It may be observed, particularly in FIGS. 2–4, that each of the openings 61 are positioned lower, lower being referenced to these Figures, than the dowel 58. Consequently, the force exerted by the biasing means 63 will have two components. One force component will tend to drive the applicator 41 toward the mandrel 10. The other force component will tend to drive the arms 36 and 37 downwardly. The absolute values for each force component will vary as the angle between a horizontal axis 91 and a centerline axis 92 of the biasing means 63 is changed by the position of the end 62 in the openings 61. The downward force component acts to keep the ends 43 of the arms 36 and 37 against the legs 35 of the brackets 32. It should be noted that disengagement of the end 62 of biasing means 63 permits removal of the applicator 41-arms 36, 37 combination from an individual applicator station 3.

An upper end 93 of each of the beams 60 has a stop means 65 mounted to it by any convenient method. Stop means 65 includes a tubular body 66 having a first end 67 intended to abut an edge of respective ones of the arms 36 and 37, and a threaded end 68. The end 68 is designed for insertion in a suitable threaded opening 94 formed in the end 93 of each of the beams 60. The complementary threads of the end 68 and opening 94 permit adjustment of the position of the body 66. It thus may be observed that the force exerted on the applicator 41 in each position of the biasing means 63, also may be adjusted by the position of the stop means 65. That is, the total force component applied by the biasing means 63 on the applicator 41 for each position of the biasing means 63, which itself is variable, further is controlled by the position of the stop means 65. The various biasing means 63, opening 61, and stop means 65 positions, in addition to their function in controlling adhesive application to the lamination stack 11, also permits the selective positioning of the arms 36 and 37 so as to provide the apparatus 1 with the capability of easy adjustment for handling various peripheral dimensions of lamination and associated mandrel 10 sizes.

An example of the adhesive application control possible with the device of our invention is illustrated in FIG. 5. As there shown, a cross hatched area 69 generally indicates the surface area of the lamination 90 face having an adhesive spread on it after passage of the lamination stack 11 along the applicators 41 in the operation of the apparatus 1.

Adhesive is applied to the lamination stack 11 in a relatively simple manner. A premeasured stack of loose laminations 90 are placed over the mandrel 10. Upon activation of the apparatus 1, the drive means 70 rotates the doctor wheel 40 which in turn rotates individual ones of the applicators 41. Suitable gearing arrangements may be used to drive the applicator 41 of each of the applicator stations 3, if desired. Thereafter, the cylinder 20 is activated to drive the shroud 22 downwardly until it engages the top-most lamination 90 of the stack 11. Shroud 22 exerts a predetermined pressure on the stack of laminations 11 which is sufficient to prevent lamination movement when the stack 11 contacts the various applicators 41. As indicated above, the direction of rotation of the applicators 41 is important. That is, the applicators 41 preferably are rotated in a direction corresponding to the particular phase of reciprocal movement of the mandrel 10. Referenced to FIG. 4, this means that the left applicator 41 is driven clockwise while the right applicator 41 is driven counterclockwise on the downward stroke of the cylinder 8. The particular directions of rotation are reversed on the upstroke of the cylinder 8. In addition, the drive means 70 is designed so that it drives the respective applicators 41 at an angular velocity that is approximately equal to the linear velocity of the stack of laminations 11 at the point of contact between the cover 57 and the lamination stack 11. Reversal of the applicator 41 direction of rotation prevents fanning of the loose laminations forming the stack 11, while speed correlation prevents smearing or squeezing of the liquid adhesive between the cover 57 and the outer edge of the lamination stack 11. This also contributes to the ability of our apparatus to apply adhesive precisely. That is, the adhesive is smoothly painted on the outer edge of the lamination stack 11 and readily wicks between the faces of adjacent laminations 90, along the areas 69.

After the reciprocal motion of the apparatus 1, the cylinder 20 raises the shroud 22 and the loose lamination stack is placed in a clamp fixture 71, shown in a loaded condition in FIG. 6.

Clamp fixture 71 includes a base 72 and a top member 73. The base 72 conventionally is circular in plan and has a sizing mandrel 74, indicated in phantom lines in FIG. 6, attached to it by any convenient method. Sizing mandrel 74 may include means for aligning the teeth 14 of the individual laminations 90 forming the stack 11, holding them against shifting. One or both of the base 72 and top member 73 may have a machined surface abutting the outboard surface of the stack 11. Those skilled in the art will recognize the use of a machined surface as a conventional expedient for insuring parallelism of at least one end of the core formed from the stack of laminations.

A plurality of clamp bolts 75 are hingedly mounted to one of the base 72 or top member 73, the former being the case in the embodiment illustrated. The other of the base 72 and top member 73 has a plurality of notches formed in it which receive the bolts 75 when the base and top members are to be clamped in the position shown in FIG. 6.

Laminations taken from the mandrel 10 are placed on the clamp fixture 71, and thereafter are compressed by suitable means. The clamp bolts 75 are positioned while the lamination stack is under pressure, and bolted to some predetermined torque requirement. For example, the stack of laminations may be compressed by a suitable hydraulic ram, not shown, exerting a pressure of approximately 500 pounds per square inch. Thereafter, the clamp bolts 75 ar torqued to 300-inch pounds, after which the clamped core is cured. Bolt torque may be set with the aid of a conventional torque wrench. Both of the pressures to which the lamination stack is subjected during placement in the clamp fixture 71 are considerably greater than the pressure exerted by the cylinder 20 during the adhesive application stage.

After torqueing of the clamp bolts 75, the ram is retracted and the stator is cured. Core clamping may be and preferably is accomplished by devices similar to those shown and described in the above-referenced U.S. patent to Zeis, U.S. Pat. No. 3,573,129. Curing of the adhesive may be conducted in conventional gas or electric fired ovens, although other forms of curing the adhesive are compatible with our invention. After cure, the lamination stack, now a stator core, is removed from the clamp fixture 71 and wound to form a stator. The clamping operation tends to squeeze the liquid adhesive that has wicked between the broad faces of the lamination so that the adhesive extends into the outline of an area 76, shown in FIG. 5, from the original area 69. It may be noted even when adhesive covers the area 76, the adhesive cannot reach the inner edge of the core defined by the teeth 14, nor does adhesive ever extend to the area about the openings 18 in the laminations. Consequently, loss of bolt down torque in the illustrative example of a hermetic stator assembly is eliminated as a problem of core construction. The particular areas 69 and 76 representing adhesive spread between faces of adjacent laminations before and after cure, respectively, are easy to monitor visually by manufacturing personnel, and relatively close manufacturing tolerances can be maintained. The adjustments provided by the biasing means 63, stop means 65, and doctor wheel 40 all are available for controlling the amount of adhesive applied to the stacks of laminations 11, should the apparatus 1 begin to apply the adhesive pattern differently from the areas 69 and 76 illustrated, for example. To our knowledge, until the invention embodied in our apparatus and method was developed, devices known in the art were not able to maintain both consistent and accurate adhesive application in conjunction with high production rates for manufacturing stator cores, for example.

Table 1, shown below, illustrates the fact that the adhesive pattern shown in FIG. 5 eliminates a loss of bolt torque problems inherent in many prior art production methods. The data shown are the results of an illustrative test to determine the effect of conventional dehydration cycles employed by hermetic compressors manufactured on core assemblies. The test is conducted by placing a stator core, after cure, on an annular fixture having four bolt receiving receptacles on a radial concentric line corresponding to the bolt hole circle of the particular lamination utilized in constructing the core. Bolts are placed through the core assembly and the bolts are torqued to 65-inch pounds with a conventional torque wrench. Thereafter, the fixture and the core are passed through a dehydration cycle where the core is subjected to 300° F. temperature for at least 15 hours. The assembly is allowed to cool to room temperature, and then the break and turn torques are established utilizing the same torque wrench used to torque the core to the fixture originally. The break torque corresponds to the torque required to break the bond between the bolt head and the stator core, while the turn torque is the torque required to move the bolt once the bolt head has been broken away from the core. In the representative sample illustrated below, six cores were tested with the resulting torques at the four bolts, read in inch-pound.

Table 1

| Core No. | Bolt 1 | Break/Turn Bolt 2 | Bolt 3 | Bolt 4 |
| --- | --- | --- | --- | --- |
| 1 | 85/68 | 85/67 | 85/68 | 87/70 |
| 2 | 80/67 | 85/67 | 90/73 | 77/67 |
| 3 | 80/68 | 88/68 | 85/68 | 85/67 |
| 4 | 81/69 | 80/68 | 80/67 | 84/80 |
| 5 | 80/68 | 85/68 | 85/80 | 80/67 |
| 6 | 85/67 | 84/67 | 77/70 | 85/67 |

From the foregoing, it will be seen that this invention is one well adapted to attain all the objects herein set forth, together with other advantages which are obvious and which are inherent to the structure disclosed. It also will be understood that certain features and subcombinations are of utility and may be employed without reference to other features and subcombinations. This is contemplated by and is within the scope of the claims.

Numerous variations, within the scope of the appended claims, will be apparent to those skilled in the art in light of the foregoing description and accompanying drawings. Thus, the apparatus 1 may be enclosed in some form of stylized enclosure. The method of driving the doctor wheel 40 or the applicator 41 may vary in other embodiments of this invention. Additional means for determining speed of the applicator and the cylinder 8 may be utilized, if desired. The adhesive pattern shown in FIG. 5 may vary with lamination design. These variations are merely illustrative.

Having thus described the invention, what is claimed and desired to be secured by Letters Patent is:

1. A machine for applying liquid adhesive to a stack of laminations, comprising:
   a stacking mandrel adapted to receive a multiplicity of laminations, said mandrel having a longitudinal axis;
   means for moving said stacking mandrel reciprocally in a direction corresponding to said longitudinal axis;
   means mounted for movement axially toward and away from said mandrel and being adapted to enclose said mandrel circumferentially and to engage and compress laminations stacked on said mandrel;
   a plurality of porous pads mounted for rotation with respect to said mandrel, said pads adapted to abut laminations stacked on said mandrel during movement of said mandrel;
   means for applying liquid adhesive to said pads; and
   means for rotating said pads so that the annular velocity of said pads at the point of abuttment of the pads and the laminations stacked on said mandrel is approximately equal to the speed of said mandrel moving along said longitudinal axis.

2. The machine of claim 1 further characterized by biasing means operatively connected to said pads, adapted to bias said pads toward said lamination stack.

3. The machine of claim 2 wherein said biasing means is further characterized by means for positioning said bearing means in a plurality of positions, each of said positions varying the force applied to said pads by said biasing means.

4. The machine of claim 3 further characterized by stop means operatively connected to said pads, adapted to vary the force applied to said pads in each of said plurality of positions of said biasing means.

5. The machine of claim 4 wherein said means for rotating said pads includes drive means operatively connected to said means for applying liquid adhesive to said pads.

6. The machine of claim 5 wherein said means for applying adhesive comprises a plurality of cylinders, individual ones of said cylinders having an outer surface in abuttment with individual ones of said porous pads.

7. A machine for applying liquid adhesive to a stack of laminations comprising:
 a stacking mandrel adapted to receive a multiplicity of laminations, said stacking mandrel having a longitudinal axis;
 means for reciprocally moving said stacking mandrel along said longitudinal axis;
 means mounted for movement axially toward and away from said mandrel and reciprocally with said mandrel along said longitudinal axis, said last mentioned means being adapted to embrace said mandrel circumferentially and to engage and compress laminations stacked on said mandrel;
 a plurality of porous pads mounted for rotation with respect to said mandrel and adapted to abut laminations stacked on said mandrel;
 means for applying liquid adhesive to said pads; and
 means for rotating said pads in a first direction as said mandrel moves along one of said reciprocal movement directions and for rotating said pad in a second direction as said mandrel moves along the other of said reciprocal movement directions.

8. The machine of claim 7 wherein said porous pads are cylindrical in cross section, said machine being further characterized by biasing means, said biasing means being operatively connected to said pads so as to bias said pads toward abuttment with laminations placed on said stacking mandrel.

9. The machine of claim 8 wherein said biasing means is further characterized by a plurality of adjustment positions for varying the force applied to said pads by said biasing means.

10. The machine of claim 9 further characterized by stop means operatively connected to said pads, adapted to further vary the force applied by said biasing means in each of said plurality of adjustment positions.

11. The machine of claim 10 wherein said means for rotating said pads include drive means operatively connected to said means for applying liquid adhesive to said pads, said last mentioned means comprising a plurality of cylinders, individual ones of said cylinders adapted to abut individual ones of said pads.

12. The machine of claim 3 wherein each of the cylinders comprising said liquid adhesive applying means includes an outer surface, said outer surface having a plurality of lands and grooves formed in it.

13. The machine of claim 12 wherein said rotating means drives said pads through said adhesive applying means so that the angular velocity of said pads at the point of abuttment of said pads and laminations stacked on said mandrel is approximately equal to the speed of said mandrel moving along said longitudinal axis.

14. A machine for applying liquid adhesive to a stack of laminations comprising:
 a stacking mandrel adapted to receive a multiplicity of laminations forming said stack, said mandrel having a longitudinal axis;
 means for reciprocally moving said stacking mandrel along said longitudinal axis;
 means mounted for movement axially toward and away from said mandrel and reciprocally with said mandrel along said longitudinal axis, said last mentioned means being adapted to engage and compress laminations stacked on said mandrel;
 a plurality of roller pads having a porous face mounted for rotation with respect to said mandrel and adapted to abut laminations stacked on said mandrel during movement of said mandrel;
 means for applying liquid adhesive to the porous face of said rollers; and
 means for rotating said roller pads in a first direction as said mandrel moves along one of said reciprocal movement directions and for rotating said roller pads in a second direction as said mandrel moves along the other of said reciprocal direction of movement.

15. A process for producing a stator core, comprising:
 measuring a stack of individual laminations forming said core, said laminations each having inwardly radially extending teeth and yoke sections radially outboard of said teeth, edges of said teeth and said yoke sections defining inner and outer surfaces, respectively, of the stack formed by said laminations, said stack of laminations having a longitudinal axis;
 applying to the stack of laminations of predetermined axially compressive force;
 moving said stack of laminations reciprocally along said longitudinal axis while maintaining said axial compressive force on said laminations;
 applying a liquid adhesive to the outer surface of the lamination stack from at least one porous roller applicator;
 rotating said porous roller applicator as said stack of laminations moves along said longitudinal axis, said roller applicator being adapted to abut the outer surface of said lamination stack during movement of the stack;
 squaring said stack and clamping the square stack under a predetermined axial pressure; and
 curing said adhesive.

16. The process of claim 15 where said rotating step includes rotating said porous roller applicator in a first direction as said stack of laminations moves in one of said reciprocal directions, and rotating said porous roller applicator in a second direction as said stack of laminations moves in the other of said reciprocal directions.

* * * * *